United States Patent [19]

Licht et al.

[11] Patent Number: 5,472,807
[45] Date of Patent: Dec. 5, 1995

[54] ALUMINUM-FERRICYANIDE BATTERY

[75] Inventors: Stuart L. Licht, Charlton City, Mass.;
Catherine L. Marsh, Exeter, R.I.

[73] Assignee: The United States of America as represented by the Secretary of the Navy, Washington, D.C.

[21] Appl. No.: 168,787

[22] Filed: Nov. 30, 1993

[51] Int. Cl.⁶ .................................................. H01M 4/06
[52] U.S. Cl. ......................... 429/188; 429/206; 429/207; 429/223
[58] Field of Search ................................ 429/188, 206, 429/207, 223

[56] References Cited

U.S. PATENT DOCUMENTS

| | | | |
|---|---|---|---|
| 4,180,623 | 12/1979 | Adams | 429/21 |
| 4,563,403 | 1/1986 | Julian | 429/198 |
| 4,668,347 | 5/1987 | Hobermann et al. | 204/33 |
| 5,182,178 | 1/1993 | Brizendine et al. | 429/160 |

Primary Examiner—Prince Willis, Jr.
Assistant Examiner—M. Nuzzolillo
Attorney, Agent, or Firm—Michael J. McGowan; Prithvi C. Lall; Michael F. Oglo

[57] ABSTRACT

A battery capable of producing high current densities with a high charge capacity is described which includes an aluminum anode, a ferricyanide electrolyte and a second electrode capable of reducing ferricyanide electrolyte which is either dissolved in an alkaline solution or alkaline seawater solution. The performance of the battery is enhanced by high temperature and high electrolyte flow rates.

37 Claims, 5 Drawing Sheets

ALUMINUM-FERRICYANIDE BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to an aluminum-ferricyanide battery and more particularly to an aluminum-ferricyanide battery wherein the ferricyanide is electrochemically reduced in solution.

2. Description of the Prior Art

Presently, a high power density primary battery based on aluminum and silver oxide alkaline half cells provides sufficient energy for vehicle propulsion. A major advantages of this electrochemical system is the extraordinary current densities, in excess of 1 ampere/cm$^2$, which are readily achieved. The high current densities are indicative of facile electron transfer in both the anodic and the cathodic redox couples. However, a major disadvantage of the alkaline aluminum silver oxide primary battery is the use of precious metals, thus increasing the cost of the system.

U.S. Pat. No. 3,985,585, discloses a process for treating aluminum with a ferricyanide compound as a coating, not as an active electrochemical species. Thus, the aluminum is not being oxidized electrochemically and the ferricyanide is not being reduced in an electrochemical reaction.

U.S. Pat. No. 4,950,560 discloses an aluminum alloy to be used as an anode in a battery. Furthermore, it discloses that the alloy is capable of achieving high voltage and columbic efficiency if an aqueous alkaline electrolyte is used. This patent specifies a particular alloy and its composition to achieve a desired electrochemical performance.

It is a general object and purpose of the present invention to provide a battery capable of producing high current densities.

A further object is to construct such a battery using relatively inexpensive materials for forming the cathode, anode and electrolyte.

A still further object is to provide a battery with a high charge capacity.

SUMMARY OF THE INVENTION

Accordingly, this invention provides a battery which comprises an aluminum anode, a ferricyanide electrolyte and a second electrode capable of reducing ferricyanide. The ferricyanide electrolyte is dissolved in an alkaline, a seawater or an alkaline-seawater solution. The overall electrochemical reaction for the battery is indicated by Equation 1.

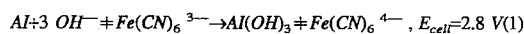

$Al+3\ OH^- + Fe(CN)_6^{3-} \rightarrow Al(OH)_3 + Fe(CN)_6^{4-}$, $E_{cell}=2.8\ V$ (1)

The performance of the battery is enhanced by high temperature and high electrolyte flow rates. The theoretical potential of the aluminum/ferricyanide battery of 2.8 Volts is 0.1 volt greater than the comparable aluminum/silver oxide cell presently available. The power density and polarization losses of the battery of this invention compare favorably with the presently available aluminum/silver oxide battery. At 85° C., the aluminum polarization losses of the cathodes are less than 0.5 mV cm$^2$ mA$^{-1}$ in either system. Consequently, the polarization losses of the cathodes must be compared. At 85° C., the polarization losses of the silver oxide cathode is −0.6 mV cm$^2$ mA$^{-1}$, while the polarization losses of the ferricyanide cathode on a porous nickel electrocatalyst is −0.3 mV cm$^2$ mA$^{-1}$. The combined anodic and cathodic losses on an aluminum ferricyanide battery are less than 1 mV cm$^2$ mA$^{-1}$. This permits the unusually high current densities, in excess of 1600 mA/cm$^2$, and high power densities, in excess of 2 watts/cm$^2$ measured on the aluminum ferricyanide battery.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
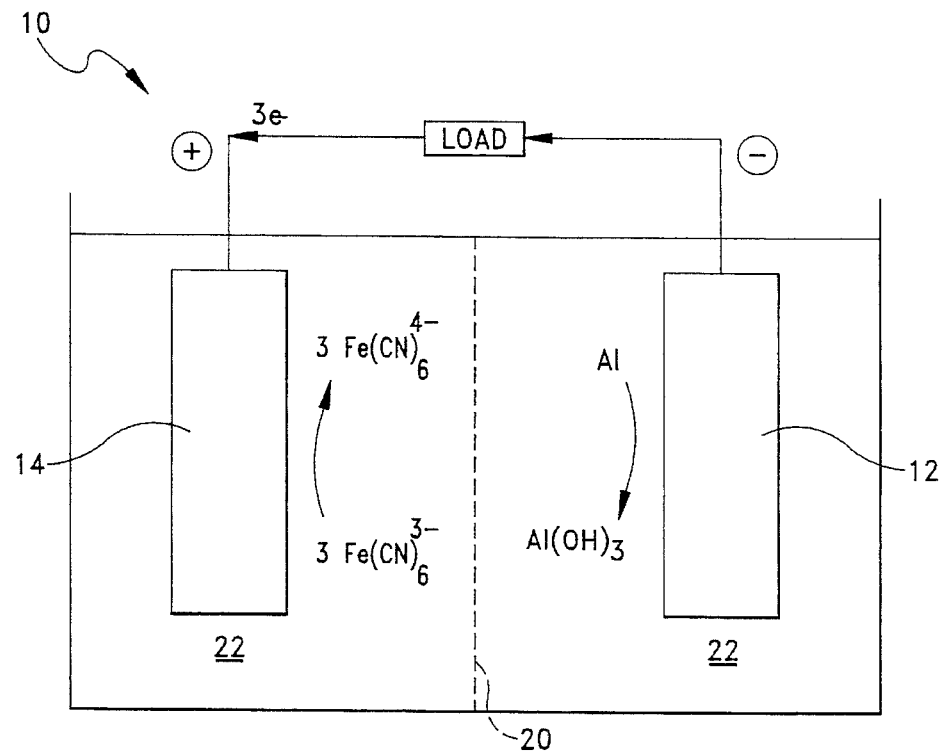
FIG. 1 illustrates the storage cell of this invention.

The present invention provides a battery which is based upon the following electrochemical reactions:

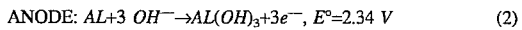

ANODE: $Al+3\ OH^- \rightarrow Al(OH)_3 + 3e^-$, $E°=2.34\ V$ (2)

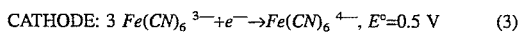

CATHODE: $3\ Fe(CN)_6^{3-} + e^- \rightarrow Fe(CN)_6^{4-}$, $E°=0.5\ V$ (3)

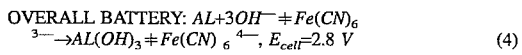

OVERALL BATTERY: $Al+3OH^- + Fe(CN)_6^{3-} \rightarrow Al(OH)_3 + Fe(CN)_6^{4-}$, $E_{cell}=2.8\ V$ (4)

It should be noted that Equations (4) and (1) give the same overall voltage.

The anode of the battery of this invention can be pure aluminum, which is readily available at a purity of at least about 99.9% or an aluminum alloy, which is readily available at a purity of at least 99.9%. Use of a suitable aluminum alloy is also possible. The aluminum alloy preferably has a composition which permits the electrochemical reaction at the anode to proceed as set forth above by Equation 2. Representative suitable alloys include aluminum-magnesium, aluminum-tin, aluminum-gallium, aluminum-indium, aluminum-indium-tin, aluminum-magnesium-tin, aluminum-magnesium-tin-gallium or the like.

The electrolyte utilized in the battery of this invention comprises a ferricyanide aqueous solution wherein the concentration of ferricyanide is at least 0.001 molar, preferably 1.0 molar up to the capacity of the solution to retain ferricyanide. Ferricyanide salts in the solid phase may also be kept in contact with the solution. Suitable soluble ferricyanide salts which can be utilized include the potassium, sodium, ammonium, magnesium, calcium, cesium, aluminum, or lithium salts of ferricyanide or mixtures thereof or salts such as $(NH_4)_2Fe(CN)_5(NH_3)$ in which one or more of the $CN^-$ ligands is replaced with alternative ligands. Suitable replacements for ferricyanide salts include ferrocene/ferrocenium derivatives with similar electrochemical properties to ferricyanide salts. The ferricyanide salt solution also contains an alkaline compound, or a salt, or seawater, or mixtures thereof or the like. Generally, the alkaline compound, and/or salt, and/or seawater is present in an amount in order to have a solution conductivity of at least about 1 millimho/cm, preferably to at least 100 millimho/cm. The ferricyanide salt solution may also contain an alkaline compound, seawater or mixture of an alkaline compound and seawater electrolyte. Suitable alkaline hydroxide compounds include ammonium, lithium, sodium, potassium, cesium or barium hydroxide. Suitable salts include halides, nitrates, sulfates and mixtures thereof or the like with a cation selected from the group including ammonium, lithium, sodium, potassium, cesium or barium.

A second electrode is required to complete the battery circuit and is formed of a metal capable of catalyzing the ferricyanide reduction illustrated by Equation (3) above. Representative suitable materials for forming the second electrode include platinum, palladium, nickel, cobalt, molybdenum, iridium, or alloys thereof or composite electrodes formed of a plurality of layers of these metals or their alloys. A preferred electrode is formed of porous nickel since it provides a high surface area which allows access to high current densities, over 1 amp/cm$^2$.

Figure 2:
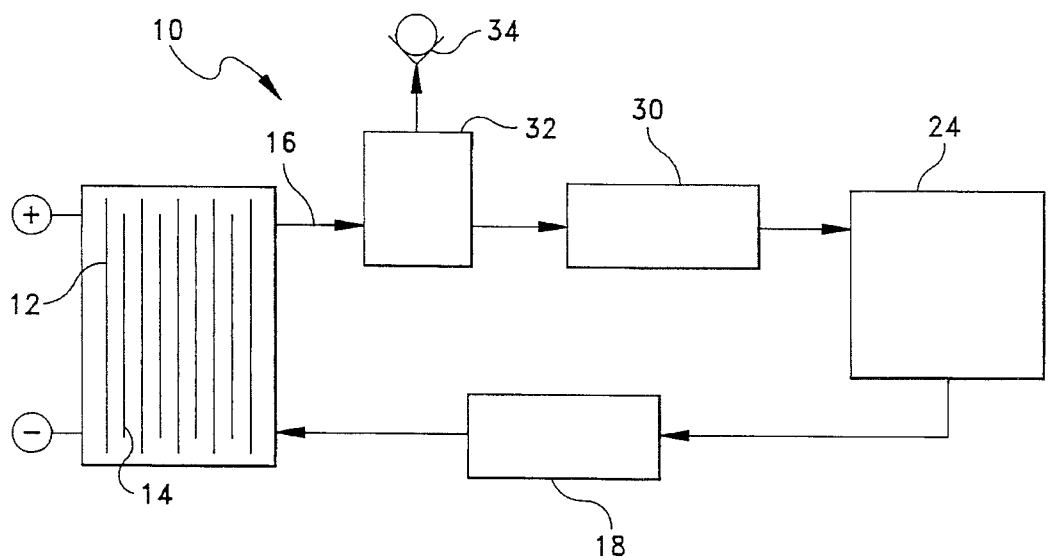
FIG. 2 is a schematic diagram of a battery system utilizing the teachings of this invention.

In FIG. 1, cell 10 is a diagrammatic representation of an electrochemical storage cell based on the aluminum and ferricyanide oxidation-reduction reaction. Specifically, cell 10 contains an aqueous ferricyanide solution 22 in contact with an electrocatalytic cathode 14. Reduction of $Fe(CN)_6^{3-}$ artions to $Fe(CN)_6^{4-}$ artions is achieved via electrons available from electrode 14. Aluminum electrode 12 is also in contact with the solution. Electrons are released in the oxidation of aluminum from the zero valent to the 3+ oxidation state. More specifically, solution 22 contains $K_3Fe(CN)_6$ and KOH. The cell may optionally contain a membrane 20 shown in FIG. 1 as a dotted line for minimizing the interaction between the anodic and cathodic half reactions. In use, it is preferred to operate this invention at elevated temperatures. The temperature is conveniently controlled by flowing the electrolyte between the battery housing and a heater by any conventional means. One effective means for operating the battery of this invention is shown in FIG. 2 wherein the battery 10 includes an aluminum anode 12, a second electrocatalytic electrode 14 and a ferricyanide electrolyte 22. The electrolyte is removed from the battery 10 through conduit 16 by means of a pump 18 and is cycled to heat exchanger 30 through gas-liquid separator 32. The electrolyte from heat exchanger 30 is returned to battery 10 through electrolyte reservoir 24 and conduit 16. Gas is removed through conduit 34.

The following examples illustrate the present invention and are not intended to limit the scope of the invention.

EXAMPLE I

Figure 3:
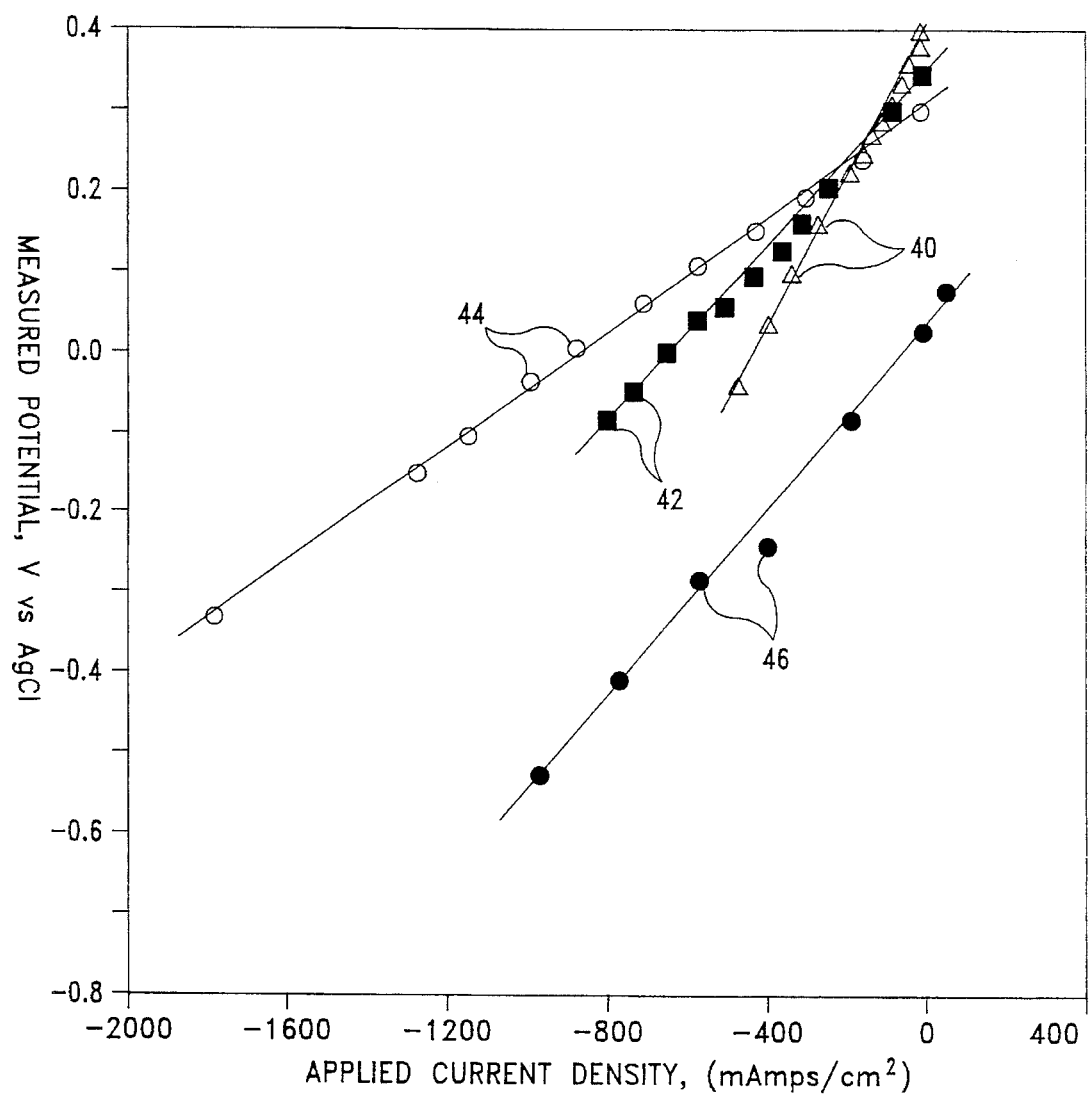
FIG. 3 graphically illustrates the potential at different currents for the cathode of this invention using an 80 pore per inch porous nickel as an electrocatalyst.

This example illustrates the utility of the cathode of the aluminum-ferricyanide battery. FIG. 3 graphically illustrates the rapid accessibility to and minimum polarization losses associated with the electrical charge stored in the ferricyanide electrolyte, e.g., aqueous ferricyanide in a solution containing 3 m KOH and 0.5 cm$^2$ $K_3Fe(CN)_6$. FIG. 3 presents ferricyanide reduction (discharge) at an 0.5 cm$^2$ porous nickel electrode with a porosity of 80 pores per inch. Measurements of potentials at the cathode were made both at open circuit and at varying current densities. The measurements were made with respect to a silver/silver chloride reference electrode. In the FIG. 3, the plot with the open triangles 40 made at 25° C. and the plot with the blackened squares 42 is made at 55° C. and the plot with open circles 44 is made at 85° C. in 3 m KOH for comparison purposes. As shown in FIG. 3, the discharge potential associated with ferricyanide reduction is several hundred millivolts more positive and hence more favorable than at the silver oxide cathode. Activity of the electrodes remained stable up to the current densities indicated in the figures. At high temperatures ferricyanide may be discharged at current densities in excess of 1800 mA/cm$^2$ with low polarization losses.

The polarization losses associated with the cathodes are shown in Table 1. Larger absolute polarization losses are detrimental to battery performance.

As shown in Table 1 below, the high surface area, porous nickel, electrocatalytic cathode diminishes polarization losses associated with ferricyanide discharge. Thus, the polarization losses are shown to be approximately one third the losses incurred on a planar platinum surface. Also shown in Table 1 are the reduced polarization losses associated with ferricyanide discharge at porous nickel compared with the comparable silver oxide cathode.

TABLE 1

| | Polarization, mV-cm$^2$ mA$^{-1}$ | | |
|---|---|---|---|
| Temp (°C.) | ferricyanide/Pt. | ferricyanide/80 ppi Ni | silveroxide |
| 25 | −3.8 | −0.9 | −2.1 |
| 55 | −2.2 | −0.6 | −0.9 |
| 85 | −1.3 | −0.3 | −0.6 |

EXAMPLE II

Figure 4A:
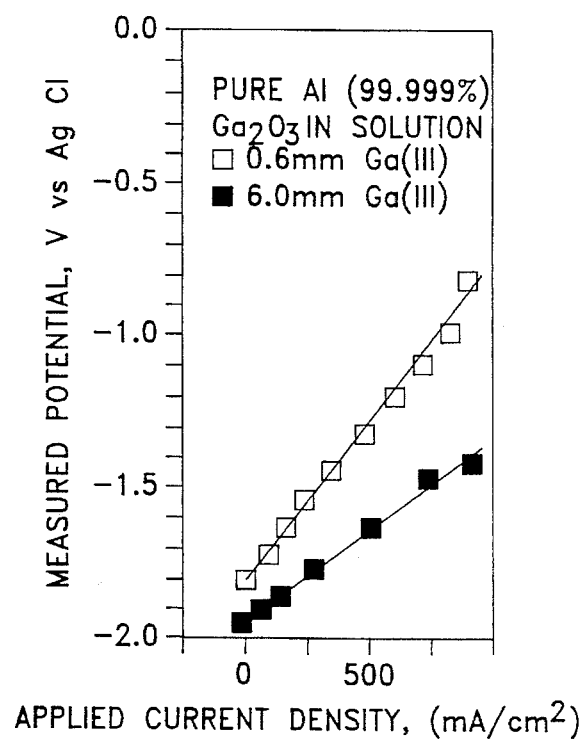
FIGS. 4a and 4b graphically illustrate the potential at different currents for the aluminum anode of this invention in a ferricyanide solution.
Figure 4B:
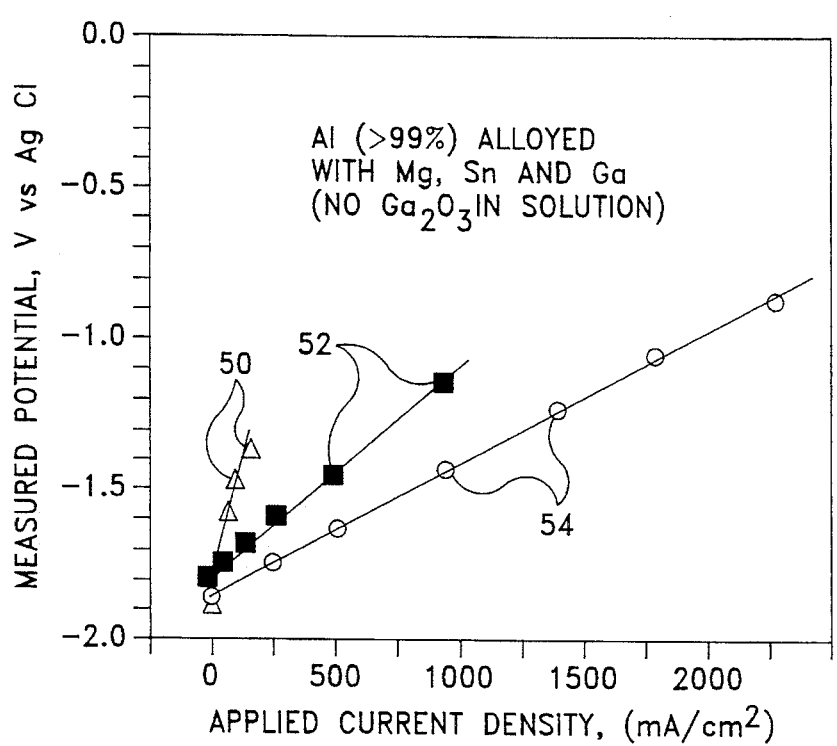

This example illustrates the utility of the anode of the aluminum-ferricyanide battery. FIG. 4 illustrates the rapid accessibility to and minimal polarization losses associated with the electrical charge stored in the aluminum anode electrode as discharged in a ferricyanide electrolyte, e.g., aqueous ferricyanide in a solution containing 3 m KOH and 0.5 m $K_3Fe(CN)_6$. and 0.006 m $Na_2SnO_3$. FIG. 4 presents aluminum oxidation (discharge) at an 0.5 cm$^2$ pure aluminum or alloyed aluminum electrode, with or without a gallium oxide solution additive. Measurements of potential at the anode were made with respect to a silver/silver chloride reference electrode. In the FIGS. 4, the plot with the open triangles (50) is made at 25° C., the plot with the blackened squares (52) is made at 55° C. and the plot with open circles (54) is made at 85° C. Activity of the electrodes remained stable up to the current densities indicated in the figures. The left hand portion of FIG. 4 shows that at lower temperatures (55° C.), 0.006 m concentrations of $Ga_2O_3$ added to the solution activates a 99.999% aluminum anode, displaying both improved voltages and reduced polarization losses. The right hand portion of FIG. 4 shows that an aluminum alloy anode is as active in a $Ga_2O_3$ free solution, even at lower temperatures, when the alloy utilized incorporates small amounts of gallium directly into the solid anode. At higher temperatures of 85° C., a pure 99.999% aluminum anode remains activated in a 3 m KOH, 0.5 to 1 m $K_3Fe(CN)_6$, and 0.006 m $Na_2SnO_3$ without added solution phase $Ga_2O_3$. As illustrated in FIG. 4, at higher temperatures aluminum may be discharged at current densities in excess of 2000 mA/cm$^2$ with low polarization losses.

The polarization losses associated with the cathodes are shown in Table 2 below. The combined polarization measurements shown in Tables 1 and 2 indicate that at higher temperatures, losses of 1 mV cm$^2$ mA$^{-1}$ or less may be anticipated during discharge of the aluminum/ferricyanide battery.

TABLE 2

| Temp (°C.) | Polarization, mV cm² mA⁻¹ | |
|---|---|---|
| | 99.999% Al | Al alloy |
| 25 | — | 1.5 |
| 55 | — | 0.65 |
| 85 | 0.42 | 0.43 |

EXAMPLE III

Figure 5A:
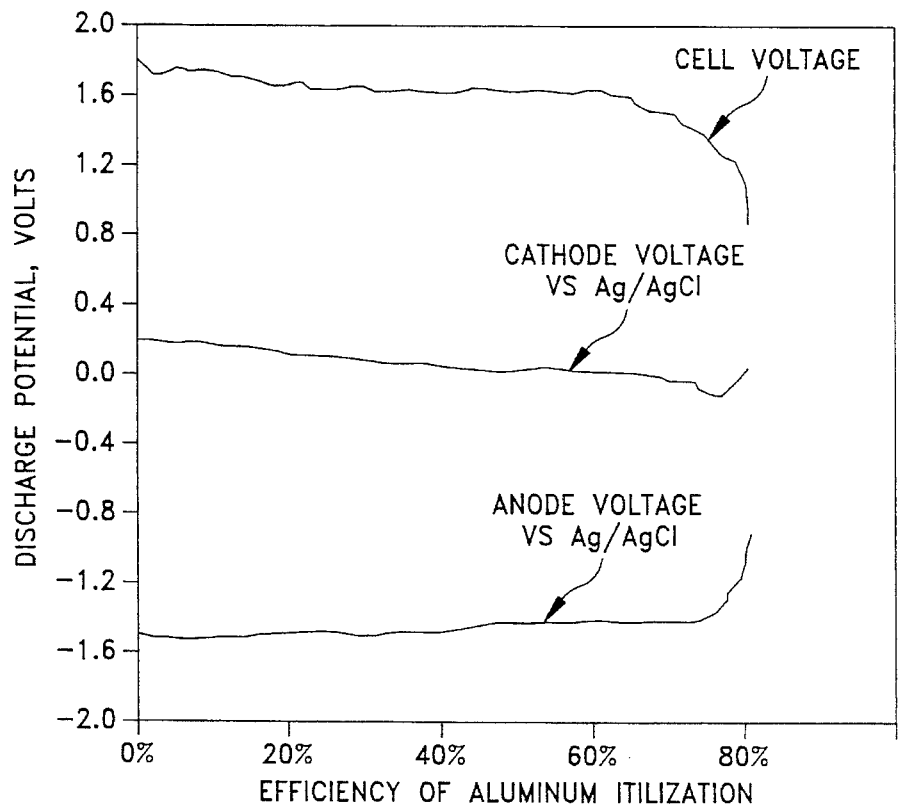
FIGS. 5a and 5b are graphical representations of the variation of discharge characteristics of the battery of this invention with solution additives.
Figure 5B:
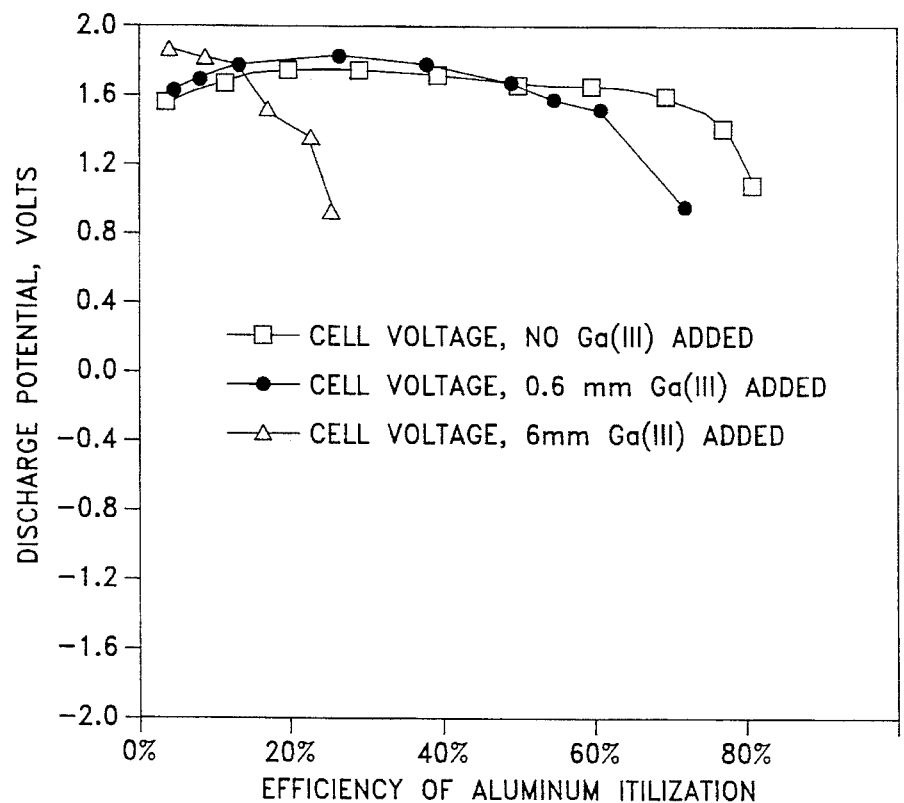

This example illustrates the utility of the aluminum-ferricyanide battery additives in a miniature cell. FIG. 5 illustrates the efficient utilization of the active battery materials, aluminum and ferricyanide, and the effect of solution phase additives. The battery utilized comprised a stirred 85° C. solution containing 3 m KOH, 0.5 m $K_3Fe(CN)_6$, 0.006 m $Na_2SnO_3$ aqueous electrolyte, containing an 0.5 mm thick by 0.6 cm$^2$ 80 pore per inch porous nickel electrode. The electrodes were externally connected through a 3.5 ohm load, and measurements were made of the cell potential and charge generated. A third electrode, a silver/silver chloride reference electrode, was immersed in the solution and used as a separate measurement check of the anode and cathode potential.

The left hand portion of FIG. 5 shows, in accordance with Equation 2, an aluminum alloy anode can be discharged with chemical to electrochemical utilization efficiencies in excess of 81% of the available aluminum. Absorption spectroscopy measurement of the ferricyanide concentration at 418 nm in solution shows that, in accordance with Equation 3, the ferricyanide in the battery was electrochemically discharged at a chemical to electrochemical conversion efficiency of 86%. The right hand portion of FIG. 5 illustrates that a 99.999% aluminum anode may be discharged to similar utilization efficiencies as with the alloyed aluminum anode, and a $Ga_2O_3$ solution phase additive improves discharge voltage, but decreases Al utilization efficiency of the battery.

EXAMPLE IV

This example illustrates the utility of the aluminum-ferricyanide battery in the embodiment described in FIG. 2. The battery utilized comprised an 85° C. solution containing 1.6 kg $H_2O$ and 3 m KOH, 1 m $K_3Fe(CN)_6$, 0.006 m $Na_2SnO_3$ aqueous electrolyte, pumped at 500 cc/minute through a cell containing an 0.5 mm thick by 67.7 cm$^2$ Al alloy electrode separated by 0.5 mm from an 1.5 mm thick by 67.7 cm$^2$ 80 pore per inch porous nickel electrode. The electrodes were externally connected through a viable resistance carbon pile load, and measurements were made of the cell potential. A third electrode, a silver/silver chloride reference electrode, was located in the cell and used as a separate measurement check of the anode and cathode potential. The volume of separated gas was measured during battery discharge.

Figure 6:
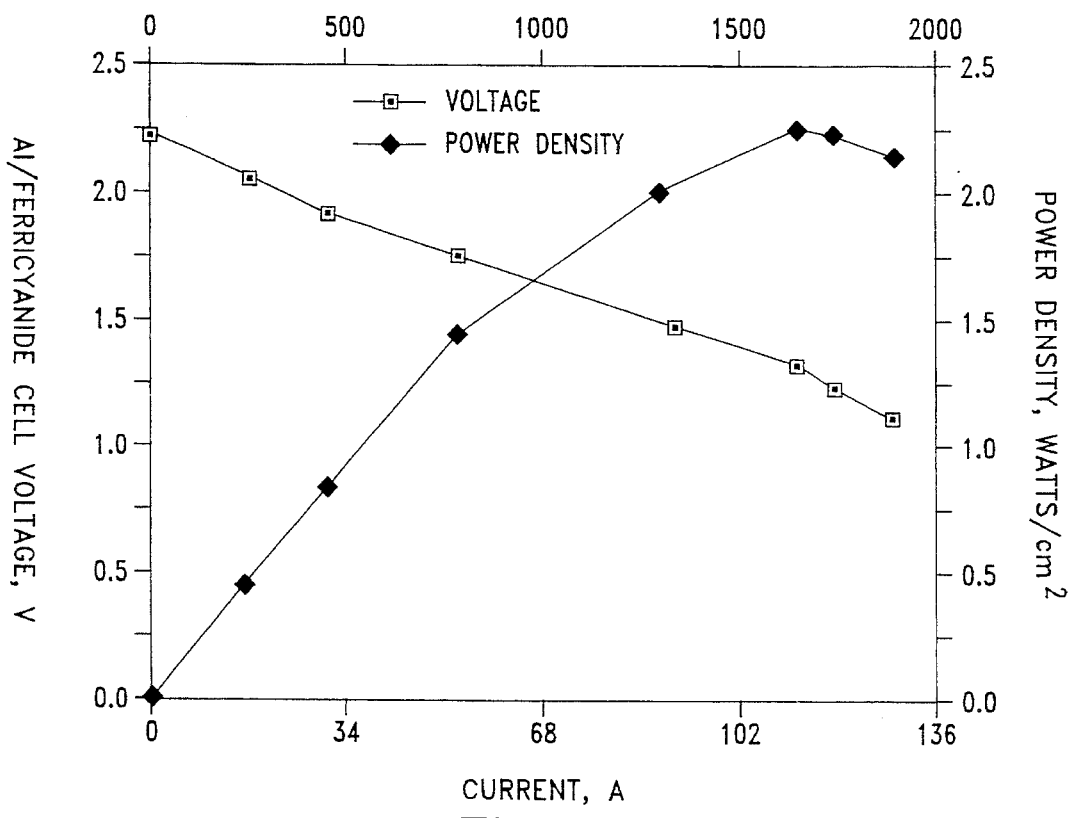
FIG. 6 illustrates graphically the voltage and power variation as a function of applied load of the battery of this invention.
Figure 7:
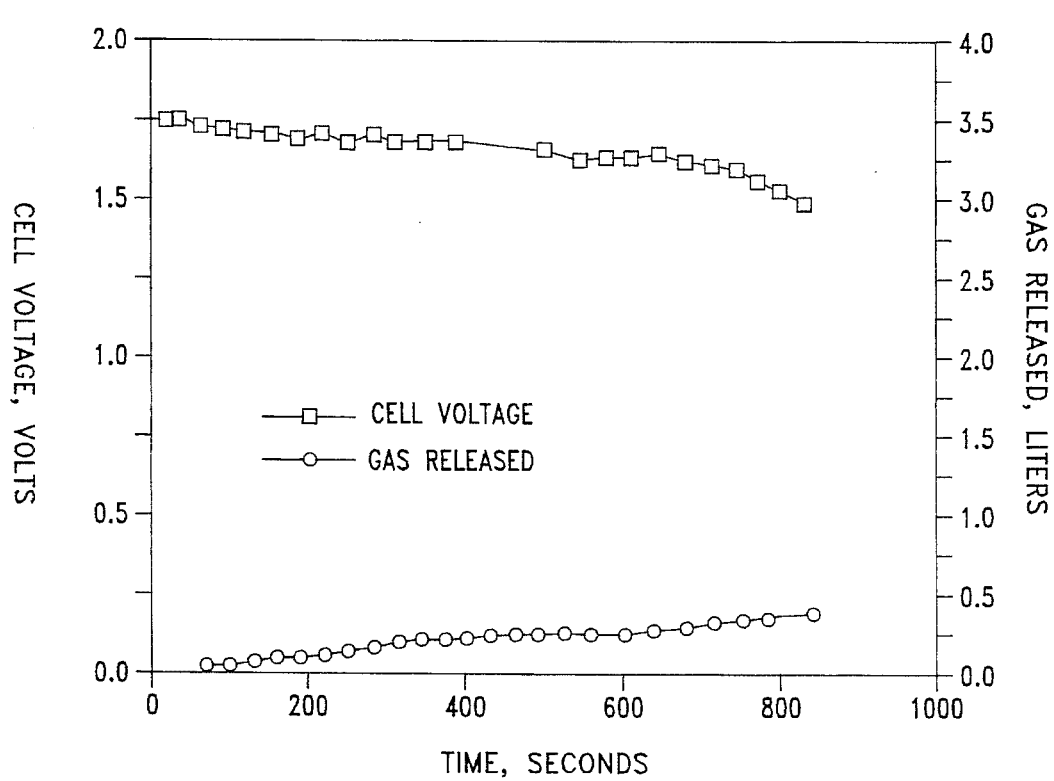
FIG. 7 illustrates graphically the discharge characteristics of the battery of this invention.

FIG. 6 graphically illustrates the high currents and power densities generated in the battery of this invention when discharged as described above. Currents in excess of 100 amperes and power densities in excess of 2 watts per cm$^2$ were sustained in the cell. FIG. 7 shows graphically the discharge of aluminum/ferricyanide battery at a constant current of 54 amperes, or a current density of 800 mA/cm$^2$. Gas generated in the cell was low amounting to 0.39 liter during the course of a 12.5 watt hour discharge. Aluminum utilization efficiency was 81.5% as determined by mass loss following the battery discharge.

There is thus described a battery which includes an aluminum anode, a ferricyanide electrolyte and a second electrode which is capable of reducing ferricyanide. The ferricyanide electrolyte is dissolved in an alkaline seawater solution. It should be noted that the embodiments described are to be considered for illustration only and as not as limitation. It will be manifested to those skilled in the art that various modifications may be made without deviating from the teachings of subject inventive concept herein described except in so far as indicated by the scope of the appended claims.

What is claimed is:

1. An electrical storage cell comprising two electrochemical half cells positioned in electrochemical contact with one another, at least one of said two half cells comprising:

seawater used as an aqueous salt solution comprising ferricyanide anions, the solution comprising at least about 0.001 molar ferricyanide;

a current transferring electrocatalytic electrode positioned in electron-transferring contact with said aqueous solution; and the remaining half cell of said two half cells including an anode of material comprised of aluminum at least about 99.99% purity.

2. The electrical storage cell of claim 1 wherein said anode is comprised of an aluminum alloy.

3. An electrical storage cell of claim 1 wherein said seawater used as an aqueous salt solution comprises a multi-phase redox couple having a ferricyanide salt solution and solid phase ferricyanide salts.

4. The electrical storage cell of claim 1 wherein said electrocatalytic electrode comprises a porous material.

5. The electrical storage cell of claim 4 wherein said porous material is nickel.

6. The electrical storage cell of claim 1 in which said electrocatalytic electrode is comprising a metal and an insoluble metal ferricyanide salt.

7. The electrical storage cell of claim 6 wherein said metal having insoluble ferricyanide salt is selected from the group of metals consisting of copper, cobalt, manganese, molybdenum, iridium, zinc, lead, platinum, palladium, nickel and alloys thereof.

8. The electrical storage cell of claim 1 in which said electrocatalytic electrode is comprising a carbon electrode.

9. The electrical storage cell of claim 1 wherein said electrocatalytic electrode is made of graphite.

10. The electrical storage cell of claim 1 further characterized in that said seawater used as the aqueous solution comprises a ferricyanide salt containing at least one cation selected from the group consisting of Li$^+$ ions, Na$^+$ions, K$^+$ions, Cs$^+$ions, NH$_4^+$ions, Mg$^{2+}$ions, Ca$^{2+}$ions, Ba$^{2+}$ions and Al$^{3+}$ions.

11. The electrical storage cell of claim 1 further characterized in that said ferricyanide anion includes a CN$^-$ ligand selected from a group consisting of $NH_3$, $H_2O$, $NO_2$, and $Fe(CN)_5{}^{2-}$.

12. The electrical cell of claim 1 which is further characterized in that said ferricyanide is replaced by ferrocene/ferrocenium.

13. An electrical storage cell of claim 1 in which said seawater used as the aqueous solution includes a hydroxide compound with at least one cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, and $Al^{3+}$ ions.

14. An electrical storage cell of claim 1 wherein said seawater used as the aqueous solution includes at least one of a plurality of halides, nitrates and sulfates with at least one cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, and $Al^{3+}$ ions.

15. The electrical storage cell of claim 1 in which said seawater used as the aqueous solution having conductivity ranging from about 0.001 millimho/cm to about 2 mho/cm.

16. An electrical storage cell of claim 1 wherein sodium stannate and gallium oxide are added to said salt solution.

17. The electrical storage cell of claim 1 further comprising means for impeding transfer of chemically reactive species between said seawater used as the aqueous solution and said redox species of said other half cell.

18. The electrical storage cell of claim 17 wherein said means for impeding chemically reactive ion transfer comprises a membrane positioned to separate said first solution from said redox species.

19. The electrical storage cell of claim 18 in which said membrane passes ions to effect ion current transfer.

20. The electrical storage cell of claim 1 which further includes a heat exchanger for controlling temperature of said ferricyanide electrolyte solution.

21. The electrical storage cell of claim 1 which further includes a gas separator for controlling gas buildup in the cell.

22. The electrical storage cell of claim 1 which further includes a solid separator for controlling solid buildup in the cell.

23. The electrical storage cell of claim 1 which further includes an electrolyte reservoir to introduce and store said seawater used as the aqueous solution.

24. The electrical storage cell of claim 1 which additionally includes an electrolyte regulator to regulate the concentration of salts in said seawater used as the aqueous solution.

25. The electrical storage cell of claim 1 which further includes a manifold to distribute flow within said storage cell.

26. The electrical storage cell of claim 1 which further includes a pump to circulate flow of said solution within said seawater used as are cell.

27. The electrical storage cell of claim 1 wherein said aluminum anode is replaced by a material selected from the group consisting of a lithium anode of at least 99.99% purity, and a lithium alloy.

28. The electrical storage cell of claim 1 wherein said anode material is replaced by a calcium anode of at least 99.99% purity.

29. The electrical storage cell of claim 1 wherein the aluminum anode is replaced by a magnesium anode material.

30. A method of generating a direct current between a first contact point and a second contact point in an electrical storage cell including two half cells having seawater used as an aqueous salt solution including ferricyanide anions, a current transferring electrocatalytic electrode positioned in said aqueous solution and an anode which includes the steps of:

providing said aqueous salt solution comprising ferricyanide anions, said solution comprising 0.001 m by weight;

positioning a solid electrode in electron-transferring contact with said aqueous solution and in electron-transferring contact with said second contact point;

providing an aluminum redox couple complementary to said ferricyanide anions, positioned in ion-current transferring contact with said aqueous solution and in electron-transferring contact with said second contact point;

establishing electrical contact with said first contact point and said second contact point; and whereby said ferricyanide anions are reduced and said aluminum is oxidized, generating an electrical current and potential between said first contact point and said second contact point.

31. The method of claim 30 wherein the aluminum anode is replaced with a lithium anode material.

32. The method of claim 30 wherein the aluminum anode is replaced with calcium.

33. The method of claim 30 wherein the ferricyanide is replaced with ferrocenium.

34. The method of claim 31 wherein the ferricyanide is replaced with ferrocenium.

35. The method of claim 32 wherein the ferricyanide is replaced with ferrocenium.

36. The method of claim 30 wherein the aluminum anode is replaced with a magnesium anode.

37. The method of claim 36 wherein the ferricyanide is replaced with ferrocenium.

* * * * *